(12) United States Patent
Choi

(10) Patent No.: US 10,056,825 B2
(45) Date of Patent: Aug. 21, 2018

(54) CONTROL APPARATUS AND METHOD IN STATIC VAR COMPENSATOR SYSTEM

(71) Applicant: LSIS CO., LTD., Anyang-si, Gyeonggi-do (KR)

(72) Inventor: Ho Seok Choi, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 0 days.

(21) Appl. No.: 15/412,004

(22) Filed: Jan. 21, 2017

(65) Prior Publication Data

US 2017/0214315 A1 Jul. 27, 2017

(30) Foreign Application Priority Data

Jan. 26, 2016 (KR) .................. 10-2016-0009662

(51) Int. Cl.
| | | |
|---|---|---|
| *H03J 3/18* | (2006.01) | |
| *H02M 1/42* | (2007.01) | |
| *H02M 1/08* | (2006.01) | |
| *H02J 3/18* | (2006.01) | |
| *H02J 3/26* | (2006.01) | |
| *G05F 1/70* | (2006.01) | |
| *H02M 1/00* | (2006.01) | |

(52) U.S. Cl.
CPC ......... *H02M 1/4208* (2013.01); *H02J 3/1864* (2013.01); *H02J 3/26* (2013.01); *H02M 1/08* (2013.01); *H02M 2001/0009* (2013.01); *Y02E 40/12* (2013.01); *Y02E 40/50* (2013.01)

(58) Field of Classification Search
CPC ....... G05F 1/70; H02J 3/14; H02J 3/16; H02J 3/18; H02J 3/1821; H02J 3/1842; Y02E 40/30; Y02E 40/34; Y02E 40/50; H02M 1/42; H02M 1/4208
See application file for complete search history.

(56) References Cited

U.S. PATENT DOCUMENTS 5,672,957 A * 9/1997 Bergmann ............... H02J 3/18
323/210
6,861,897 B1 * 3/2005 Cheng ..................... H02J 3/01
327/552
(Continued)

FOREIGN PATENT DOCUMENTS

| JP | S 58-039223 A | 3/1983 |
|---|---|---|
| JP | S 58-172923 A | 10/1983 |

(Continued)

OTHER PUBLICATIONS

European Patent Office Application Serial No. 16205676.6, Search Report dated Apr. 13, 2017, 8 pages.

*Primary Examiner* — Gary L Laxton
(74) *Attorney, Agent, or Firm* — K&L Gates LLP

(57) ABSTRACT

A control apparatus in a static VAR compensator (SVC) system includes a plurality of current supply units for supplying phase currents configuring three-phase current of a power system, a plurality of current sensors for measuring the phase currents, and a controller for determining whether unbalance occurs in the three-phase current based on the phase currents, calculating an error corresponding to the unbalance according to the phase currents if unbalance occurs, and individually controlling at least one of the plurality of current supply units so as to compensate for the error.

10 Claims, 6 Drawing Sheets

(56) References Cited

U.S. PATENT DOCUMENTS

| | | | |
|---|---|---|---|
| 8,009,450 B2 * | 8/2011 | Royak | H02M 7/219 363/84 |
| 2008/0001581 A1 | 1/2008 | Takeda et al. | |
| 2010/0109616 A1 | 4/2010 | Li et al. | |

FOREIGN PATENT DOCUMENTS

| | | |
|---|---|---|
| JP | H01227632 A | 9/1989 |
| JP | H0618460 | 3/1994 |
| JP | H07107656 | 11/1995 |
| JP | 2003-058261 | 2/2003 |
| JP | 2007280358 | 10/2007 |
| JP | 2008011626 | 1/2008 |
| KR | 20110001747 | 1/2011 |
| KR | 1043573 | 6/2011 |

* cited by examiner

CONTROL APPARATUS AND METHOD IN STATIC VAR COMPENSATOR SYSTEM

CROSS-REFERENCE TO RELATED APPLICATION

Pursuant to 35 U.S.C. § 119(a), this application claims the benefit of earlier filing date and right of priority to Korean Patent Application No. 10-2016-0009662, filed on Jan. 26, 2016, the contents of which are all hereby incorporated by reference herein in its entirety.

TECHNICAL FIELD

The present invention relates to a control apparatus and a method in a static VAR compensator (SVC) system and, more particularly, to a control apparatus and a method capable of compensating for unbalance in three-phase current in a static VAR compensator system.

BACKGROUND

In a high-capacity power conversion equipment such as a high voltage direct current (HVDC) system or a static VAR compensator (SVC) system for improving voltage stability and compensating for reactive power, system harmonic waves and unbalance have influence on system control. In particular, in the case of an SVC system, non-characteristic harmonics may abnormally increase due to single-phase faults such as unbalance in current or voltage between phases and ground fault of a power interconnection system. Therefore, these systems require a high-performance and a high-precision control scheme.

However, in control of a general SVC system, since a three-phase root mean square (RMS) value of a power system is mainly controlled by operation of a three-phase voltage and current, there is difficulty in compensation for an unbalance condition due to disturbance and faults.

Accordingly, when phase unbalance occurs in a transient or faulty state of a power system, there is a need for a method of compensating for phase unbalance to improve stability of an SVC system.

DISCLOSURE

Technical Problem

An object of the present invention is to provide a control method capable of improving system performance by enabling an SVC system to perform normal operation through control in a phase unbalance condition as well as in a normal state.

The technical problems solved by the present invention are not limited to the above technical problems and other technical problems which are not described herein will become apparent to those skilled in the art from the following description.

Technical Solution

The object of the present invention can be achieved by providing a control apparatus in a static VAR compensator (SVC) system including a plurality of current supply units for supplying phase currents configuring three-phase current of a power system, a plurality of current sensors for measuring the phase currents, and a controller for determining whether unbalance occurs in the three-phase current based on the phase currents, calculating an error corresponding to the unbalance according to the phase currents if the unbalance occurs, and individually controlling at least one of the plurality of current supply units so as to compensate for the error.

According to another aspect of the present invention, a control method of a control apparatus in a static VAR compensator (SVC) system includes supplying phase currents configuring three-phase current of a power system, measuring the phase currents, determining whether unbalance occurs in the three-phase current based on the phase currents, and calculating an error corresponding to unbalance according to the phase currents if the unbalance occurs and individually controlling at least one of a plurality of current supply units so as to compensate for the error.

Advantageous Effects

According to embodiments of the present invention, it is possible to improve system performance by enabling an SVC system to perform normal operation through control of phase unbalance as well as in a normal state.

According to the present invention, it is possible to achieve an object through algorithm development and modification and to ensure economic feasibility, by using the same structure as a controller of a general SVC system without installing additional control equipment.

Further, it is possible to achieve system availability improvement, performance improvement and quality improvement in terms of basic system function.

EMBODIMENTS

Hereinafter, the preferred embodiments of the present invention will be described with reference to the accompanying drawings. However, the technical scope of the present invention is not limited by the following embodiments and the other embodiments within the technical scope of the present invention may be easily implemented by deleting or changing the components or adding the other components.

In addition, although the terms used in the present invention are selected from generally known and used terms, some of the terms mentioned in the description of the present invention have been selected at the discretion of the applicant, the detailed meanings of which are described in relevant parts of the description herein. Furthermore, it is required that the present invention is understood, not simply by the actual terms used but by the meanings of each term as defined herein. In the following, the term "includes" does not exclude the components or steps other than those described herein.

Figure 1:
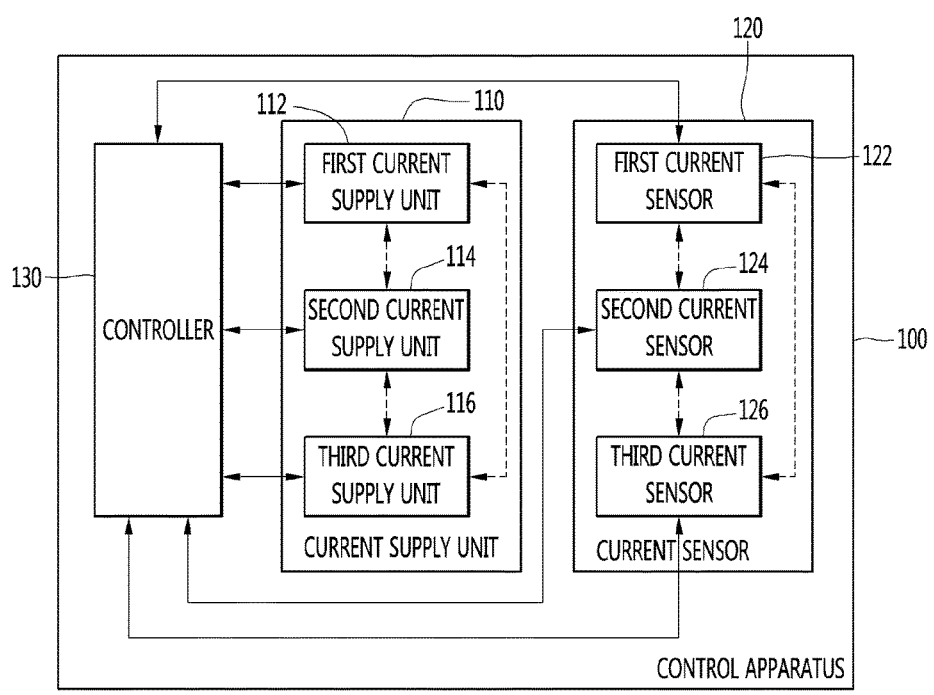
FIG. 1 is a block diagram showing the configuration of a control apparatus in an SVC system according to an embodiment of the present invention.

FIG. 1 is a block diagram showing the configuration of a control apparatus in an SVC system according to an embodiment of the present invention.

A control apparatus 100 in the static VAR compensator (SVC) system according to an embodiment of the present invention is included in the SVC system to control a thyristor controlled reactor (TCR), a thyristor switched capacitor (TSC) and a fixed capacitor (FC) included in the SVC system. The SVC system, the TCR, the TSC and the FC will be described below with reference to FIG. 6.

The control apparatus 100 in the SVC system according to the embodiment of the present invention may include a current supply unit 110, a current sensor 120 and a controller 130.

The current supply unit 110 supplies three-phase current of a power system.

More specifically, the current supply unit 110 may include a first current supply unit 112, a second current supply unit 114 and a third current supply unit 116 in correspondence with the three phases.

The first current supply unit 112, the second current supply unit 114 and the third current supply unit 116 may supply phase currents corresponding to the phases configuring the three-phase current of the power system. To this end, each of the first current supply unit 112, the second current supply unit 114 and the third current supply unit 116 may include a capacitor bank (not shown) and a bidirectional thyristor (not shown).

The bidirectional thyristor (not shown) is turned on by an ON pulse signal to open and close the capacitor bank (not shown). More specifically, when the ON pulse signal is applied to a gate of the bidirectional thyristor (not shown), a switch is turned on such that current starts to flow. In the bidirectional thyristor (not shown), two thyristors are connected in anti-parallel and thus current may bidirectionally flow in a state in which the switch is turned on.

The capacitor bank (not shown) may supply current. The capacitor bank (not shown) accumulates electric energy and then discharges current by the accumulated electric energy when the capacitor bank is opened and closed by the bidirectional thyristor (not shown).

The capacitor bank (not shown) and the bidirectional thyristor (not shown) may be connected to the power system in a Y structure or a delta structure to generate three-phase current, in some embodiments.

The current sensor 120 may measure current.

The current sensor 120 may include a first current sensor 122, a second current sensor 124 and a third current sensor 126 in correspondence with the three phases, such that current is measured according to phase.

According to one embodiment, the first current sensor 122, the second current sensor 124 and the third current sensor 126 may directly measure the phase currents of three phases. To this end, each of the first current sensor 122, the second current sensor 124 and the third current sensor 126 may include an ammeter (not shown) which is a meter for measuring DC or AC current. In this case, the first current sensor 122, the second current sensor 124 and the third current sensor 126 may be located at an input terminal for receiving three-phase current or an output terminal for outputting three-phase current.

According to another embodiment, the first current sensor 122, the second current sensor 124 and the third current sensor 126 measure the phase currents from data on the phase currents of three phases. More specifically, the first current sensor 122, the second current sensor 124 and the third current sensor 126 may perform communication with a device located outside the control apparatus 100, receive information on the measurement value of the phase currents of the three-phase current measured by the device, and measure the phase currents configuring the three-phase current therefrom. To this end, the first current sensor 122, the second current sensor 124 and the third current sensor 126 may perform wired communication with the device through a line, a power line or an optical cable or perform wireless communication, such as wireless LAN communication or mobile communication, with the device.

The controller 130 may determine whether unbalance occurs in three-phase current based on the phase currents. More specifically, the controller 130 may differentiate and integrate the phase currents configuring the three-phase current and determine whether a sum of the phase currents becomes 0. The sum is 0 in a balance state and is a non-zero value in an unbalance state. This will be described below with reference to FIG. 2.

If unbalance occurs in the three-phase current, the controller 130 may individually control at least one of the plurality of current supply units 112, 114 and 116 so as to compensate for unbalance according to phase currents.

According to one embodiment, the controller 130 may individually control at least one of the plurality of current supply units 112, 114 and 116 so as to calculate an error corresponding to unbalance according to phase currents and to compensate for the error.

More specifically, if each of the plurality of current supply units 112, 114 and 116 includes the thyristor which is turned on in order to supply the phase current, the controller 130 may individually turn the thyristor on so as to compensate for unbalance according to phase currents.

According to the embodiment illustrated in FIG. 1, if the control apparatus 100 includes the current supply unit 110 and unbalance occurs in three-phase current, the control apparatus 100 may individually control the plurality of current supply units 112, 114 and 116.

However, in some embodiments, the current supply unit 110 may not be included in the control apparatus 100 but may be provided outside the control apparatus 100 or may be included in a TSC or TCR included in the SVC system. In this case, the controller 130 may individually control the plurality of current supply units 112, 114 and 116 provided outside the control apparatus 100 so as to compensate for unbalance if it is determined that unbalance occurs in the three-phase current.

Figure 2:
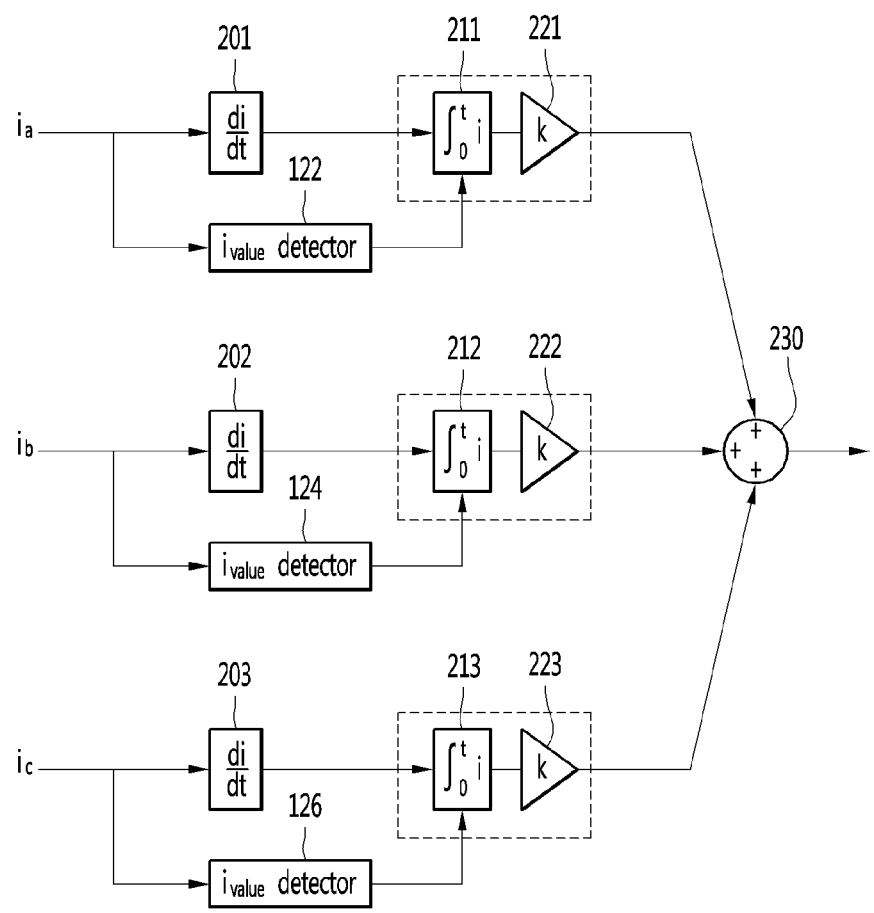
FIG. 2 is a diagram showing an internal control procedure for compensating for unbalance in three-phase current according to an embodiment of the present invention.

FIG. 2 is a diagram showing an internal control procedure for compensating for unbalance in three-phase current according to an embodiment of the present invention.

According to one embodiment of the present invention, the state of output current may be sensed according to phases of the three-phase current to measure phase currents and the phase current of each phase may be individually compensated for based on an error occurring in the measured phase current.

More specifically, the measurement value of the three-phase current becomes 0 under a three-phase balance condition. However, an unbalance value occurs in three-phase current when disturbance such as fault and failure of an external apparatus occurs. In this case, the controller 130 may generate a control signal for compensating for unbalance in the three-phase current. Each phase of the three-phase current may be individually controlled based on such a control signal.

To this end, the controller 130 may include differentiators 201, 202 and 203, integrators 211, 212 and 213, K slope determination units 221, 222 and 223 and an adder 230. In this case, the differentiators 201, 202 and 203, the integrators 211, 212 and 213 and the K slope determination units 221, 222 and 223 may be located in correspondence with the phase currents $i_a$, $i_b$ and $i_c$ configuring the three-phase current.

The differentiators 201, 202 and 203 differentiate the phase currents $i_a$, $i_b$ and $i_c$ corresponding thereto. In this case, the differentiators 201, 202 and 203 may measure current change in the phase currents $i_a$, $i_b$ and $i_c$ based on the differentiated values.

The integrators 211, 212 and 213 may integrate the phase currents $i_a$, $i_b$ and $i_c$ differentiated by the differentiators 201, 202 and 203. In this case, the integrators 211, 212 and 213 may integrate the current change measured by the differentiators 201, 202 and 203 to determine a total current change at a predetermined time.

The K slope determination units 221, 222 and 223 apply a constant $k_{slope}$ to the values output from the integrators 211, 212 and 213 and then output the values to the adder 230. Here, the constant $k_{slope}$ determines the operation characteristics of the SVC system and may be differently set according to the characteristics of the system.

The adder 230 adds the values obtained by applying the constant $k_{slope}$ to the values output from the integrators 211, 212 and 213 corresponding to the three phases.

In this case, the controller 130 determines whether the value obtained by the adder 230 is 0. The three-phase current includes three AC sine waves having a phase difference of 120 degrees and the same amplitude and frequency. Accordingly, if the SVC system normally operates such that the phase currents $i_a$, $i_b$ and $i_c$ have phase balance, a sum of the values output from the integrators 211, 212 and 213 becomes 0. However, if current unbalance occurs among three phases due to failure, a non-zero error value occurs. If the error value occurs, the controller 130 recognizes that unbalance occurs among the three phases and performs control such that the first current sensor 122, the second current sensor 124 and the third current sensor 126 measure the phase currents $i_a$, $i_b$ and $i_c$ corresponding thereto in order to individually control the three phases.

The first current sensor 122, the second current sensor 124 and the third current sensor 126 may measure the currents of the three phases. In FIG. 2, the first current sensor 122 measures the phase current $i_a$ of the phase a, the second current sensor 124 measures the phase current $i_b$ of the phase b and the third current sensor 126 measures the phase current $i_c$ of the phase c.

The first current sensor 122, the second current sensor 124 and the third current sensor 126 may be implemented by an $i_{value}$ detector. The $i_{value}$ detector may control the integrators 211, 212 and 213 connected to the output terminal according to an output value thereof. More specifically, if the output value is an ON signal, the integrators 211, 212 and 213 may be set not to operate the integrators 211, 212 and 213 and, if the output value is an OFF signal, the integrators 211, 212 and 213 operate without resetting.

To this end, the $i_{value}$ detector checks the operation states of the device of the SVC system including the TCR or the TSC when the SVC system or the device of the SVC system including the TCR or the TSC generates output currents. In this case, the $i_{value}$ detector may monitor the currents and output the OFF signal when current flows and output the ON signal when current does not flow. For example, the $i_{value}$ detector may generate and output a low (0) signal to the integrators 211, 212 and 213 when current flows and generate and output a high (1) signal to the integrators 211, 212 and 213 when current does not flow.

Conventionally, if the result of calculating the three-phase current is not 0, the SVC system performed power control by an error. In this case, the total output of the three-phase current is controlled and the phases configuring the three-phase current are not individually controlled.

However, according to the present embodiment, if unbalance occurs among the three phases, the phase current is measured according to phase and a control signal is generated based on the phase current so as to compensate for unbalance among the three phases, thereby individually controlling each phase. Accordingly, it is possible to more accurately perform control in a transient or faulty state of a system as compared to the conventional system. Accordingly, it is possible to improve stability of the SVC system.

Figure 3:
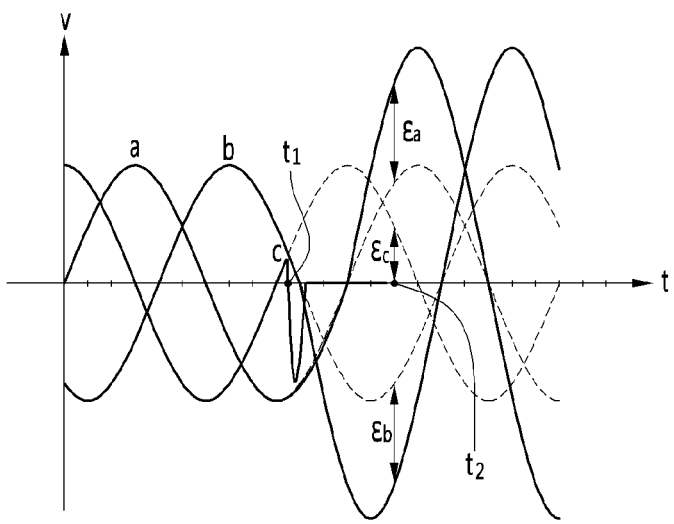
FIG. 3 is a diagram illustrating a method of compensating for unbalance in three-phase current according to an embodiment of the present invention.

FIG. 3 is a diagram illustrating a method of compensating for unbalance in three-phase current according to an embodiment of the present invention.

a-phase current a, b-phase current b and c-phase current c configuring the three-phase current are AC sine waves having the same amplitude and frequency and a phase difference of 120 degrees.

As shown in FIG. 3, when ground fault or failure occurs in the phase c at a time $t_1$, a waveform indicating the c-phase current c is distorted by an error at the time $t_1$. More specifically, the c-phase current c after the time $t_1$ has a waveform denoted by a dotted line in a normal state but has a waveform denoted by a solid line by an error occurring in the current value in an actual state in which distortion occurs.

In this case, as the voltage of the phase c decreases, the voltages of the phase a and the phase b may relatively increase or decrease. More specifically, an error occurs in the waveform indicating the a-phase current a and the waveform indicating the b-phase current b at the time $t_1$ to increase the amplitudes of the currents. Accordingly, the a-phase current a and the b-phase current b has a waveform denoted by a dotted line in a normal state and has a waveform denoted by a solid line due to increase in amplitude of the waveform and an error occurring in the current value when a fault occurs in the c-phase at the time $t_1$. Therefore, unbalance occurs in the three-phase current.

If an error due to unbalance in the three-phase current is compensated for at a time $t_2$, the phase a may be compensated for by an error $\varepsilon_a$ from the curve denoted by the dotted line, that is, the waveform of the normal state, to the curve denoted by the solid line, that is, an actual waveform, and the phase b may be compensated for by an error $\varepsilon_b$ from the curve denoted by the dotted line, that is, the waveform of the normal state, to the curve denoted by the solid line, that is, an actual waveform. Using the same method, the phase c may be compensated for by an error $\varepsilon_c$.

By this method, in the present invention, when phase unbalance occurs in the three-phase current, the error may be compensated for according to phase to individually control each phase.

Figure 4A:
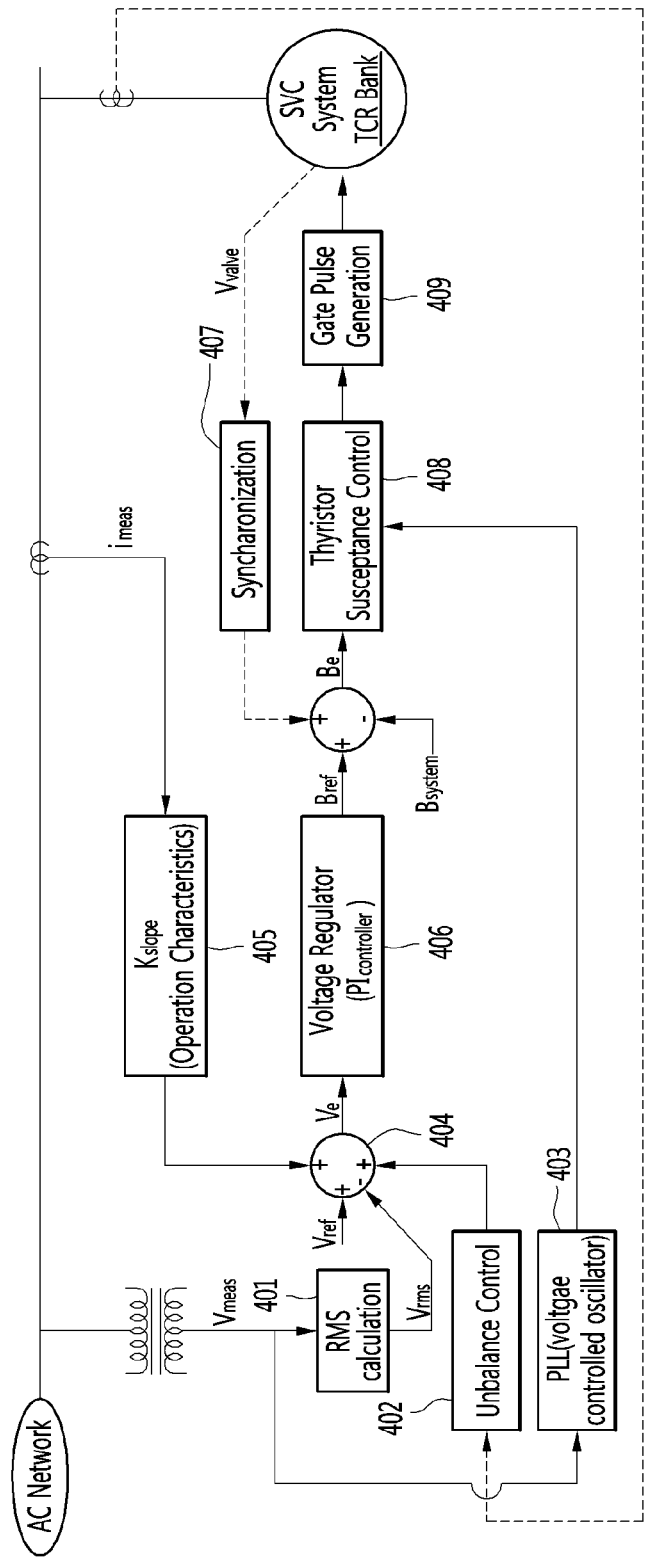
FIG. 4A is a diagram illustrating an internal control procedure of a control apparatus in an SVC system according to an embodiment of the present invention.

FIG. 4A is a diagram illustrating an internal control procedure of a control apparatus in an SVC system according to an embodiment of the present invention.

According to one embodiment of the present invention, the SVC system includes an unbalance control block to compensate for unbalance of each of the three phases.

A root mean square (RMS) calculation block 401 measures a three-phase bus voltage $V_{meas}$ and averages the measured three-phase bus voltage $V_{meas}$ to a root mean square (RMS) value $V_{rms}$ through internal calculation. Here, the RMS value may be defined as the square root of an average of instantaneous values of the waveform signal corresponding to three-phase current or voltage during one period. The RMS value $V_{rms}$ of the bus voltage is input to a comparator 404.

The comparator 404 compares the RMS value $V_{rms}$ of the bus voltage with a reference value $V_{ref}$ of the voltage of a connected power system to calculate an error $V_e$ and generates a control signal based on the calculated error $V_e$. In addition, the comparator 404 may consider the constant $k_{slope}$ determining the operation characteristics of the SVC system upon calculating the error $V_e$. The constant $k_{slope}$ may be stored in a constant $k_{slope}$ determination unit 405. The control signal generated by the comparator 404 is input to a voltage control block 406.

The voltage control block 406 may compensate for the bus voltage $V_{meas}$ based on the control signal. To this end, the voltage control block 406 is implemented by a PI controller to generate a control signal for compensation.

A thyristor susceptance control block 408 performs susceptance (B) control according to the characteristics of the SVC system for generating or consuming reactive power based on the control signal. In the case of susceptance control of the system, the phase of the bus voltage measured in order to synchronize with and control the connected power system is measured through PLL control and is compared with the control signal, thereby generating the ON signal of the thyristor. Here, operation for measuring the phase through PLL control and performing comparison with the control signal is performed by a PLL block 403 and operation for synchronizing with the connected power system is performed by a synchronization block 407.

A gate pulse generation block 409 generates the ON signal of the thyristor. The ON signal of the thyristor includes a total of six signals and a forward or backward thyristor ON signal of each phase may be complementarily generated.

An unbalance control block 402 receives and applies three-phase output current to bus voltage control and performs compensation for phase unbalance based on the same. In this case, the unbalance control block 402 may individually control each phase when an unbalance condition occurs.

Conventionally, when unbalance among three phases occurs, the RMS value of the three-phase current was calculated and an error from a balance state was compensated for based on the RMS value. Accordingly, each of the three phases does not need to be controlled and the phase current of each phase does not need to be measured.

However, according to one embodiment of the present invention, the phase current of each phase may be measured, each phase may be individually controlled based on the phase current, and such control operation may be performed by the unbalance control block 402.

Figure 4B:
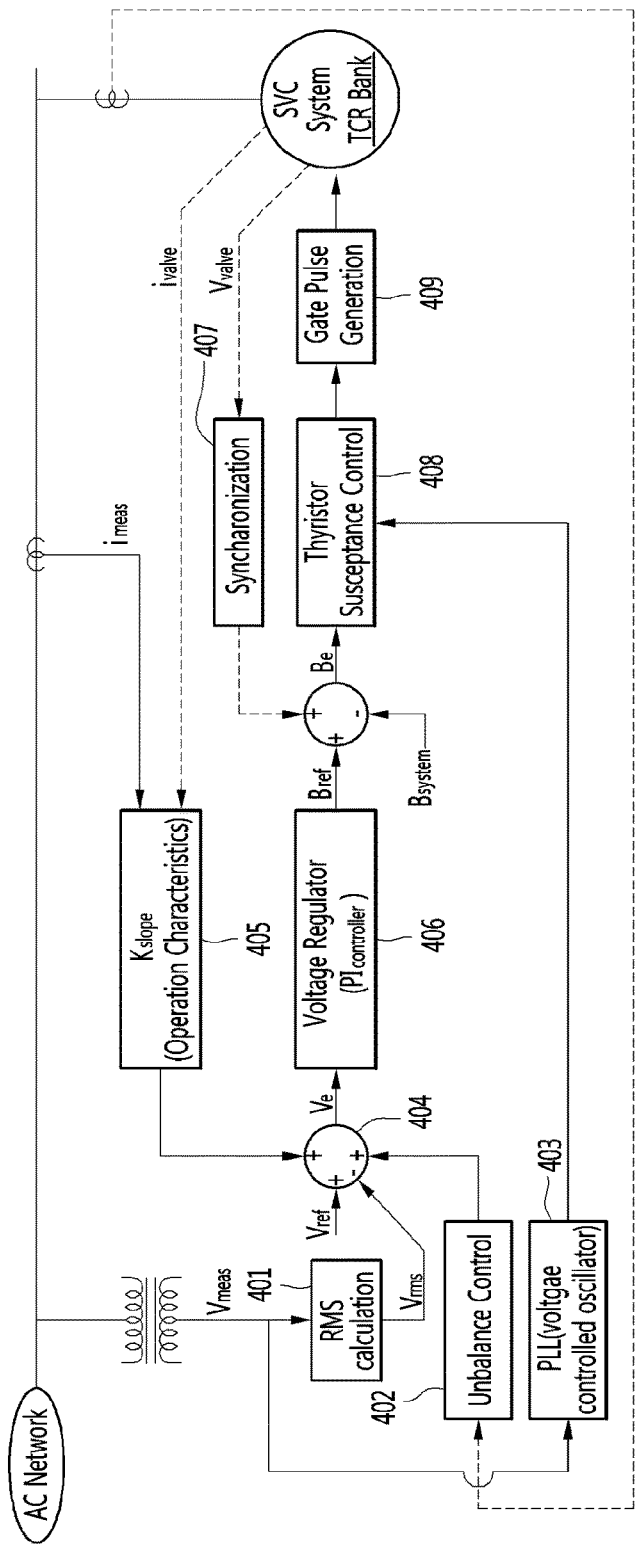
FIG. 4B is a diagram illustrating an internal control procedure of a control apparatus in an SVC system according to an embodiment of the present invention.

FIG. 4B is a diagram illustrating an internal control procedure of a control apparatus in an SVC system according to an embodiment of the present invention.

According to one embodiment of the present invention, when unbalance of each of the three phases is compensated for, the internal current of the system may be measured and applied to the constant $k_{slope}$ determining the operation characteristics of the system.

Upon considering the constant $k_{slope}$ determining the operation characteristics of the system, the associated bus current $i_{meas}$ is generally measured and used for control. However, the internal current $i_{valve}$ of the system is measured and applied to the constant $k_{slope}$, the internal current of the power conversion apparatus is measured and monitored to monitor the operation state of the SVC apparatus and perform feedback monitoring according to commands, thereby improving system reliability.

Referring to FIG. 4B, the internal current value $i_{valve}$ measured from the SVC system or the TCR bank is input to a $K_{slope}$ determination block 405. In this case, the internal current value of the system may be applied to the $k_{slope}$ constant determining the operation characteristics of the system.

Figure 5:
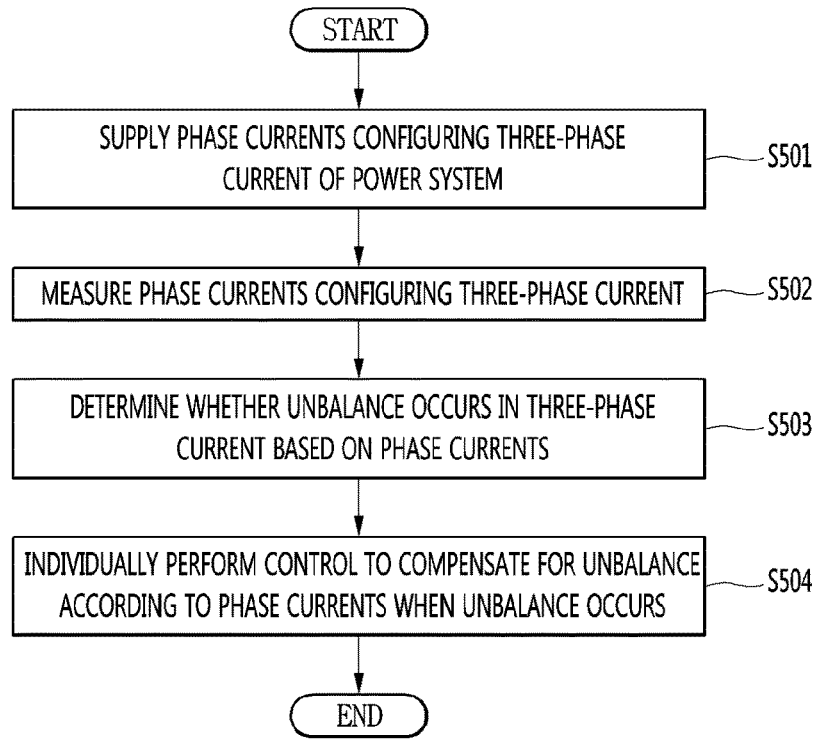
FIG. 5 is a diagram illustrating a control procedure of a control apparatus in an SVC system according to an embodiment of the present invention.

FIG. 5 is a diagram illustrating a control procedure of a control apparatus in an SVC system according to an embodiment of the present invention.

The control apparatus 100 supplies the phase currents configuring the three-phase current of a power system (S501).

The control apparatus 100 measures the phase currents configuring the three-phase current (S502).

The control apparatus 100 determines whether unbalance occurs in the three-phase current based on the phase currents (S503).

The control apparatus 100 individually performs control to compensate for unbalance according to phase currents when unbalance occurs (S504).

More specifically, the control apparatus 100 may calculate an error corresponding to the unbalance according to phase currents and control the phase current supplied to each phase to compensate for the error.

Figure 6:
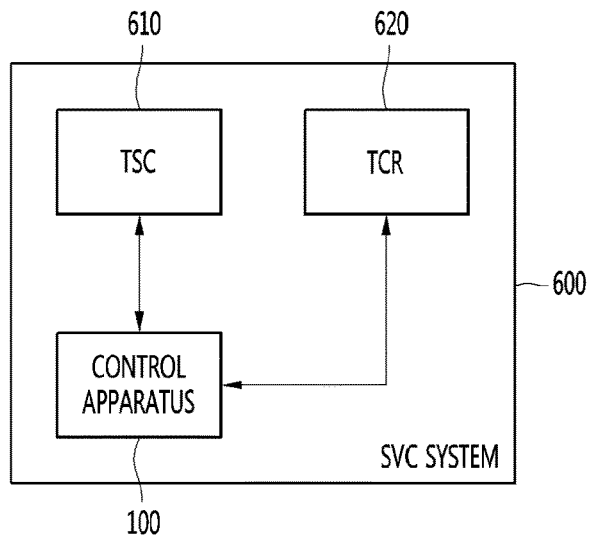
FIG. 6 is a diagram showing the configuration of an SVC system according to an embodiment of the present invention.

FIG. 6 is a diagram showing the configuration of an SVC system according to an embodiment of the present invention.

The SVC system 600 is generally available in an industrial site and a power system and, in this case, is applicable to the power system in a three phase network encapsulated type. The system is mainly applicable to compensation for a transmission voltage of a medium long-range power line, stability of a bus voltage of a massive load such as a non-linear load used for smelting or steel manufacture, power factor compensation and harmonics and flicker compensation.

In this case, the SVC system 600 may be connected to the power system in parallel to generate or absorb reactive power, thereby controlling reactive power. To this end, the SVC system may include a TSC 610, a TCR 620 and a fixed capacitor (FC).

The TSC 610 may control the current of a capacitive load to generate reactive power of a connected bus, thereby stabilizing a voltage. To this end, the TSC 610 may include a thyristor (not shown) and a capacitor (not shown).

The TCR 620 may control the current of an inductive load to consume reactive power of a connected bus, thereby controlling the voltage of the connected bus which is a main control object. To this end, the TCR 620 may include a thyristor (not shown) and a reactor (not shown). The reactor (not shown) may be provided at both ends or one end of the thyristor (not shown).

In this case, the general control structures of the TSC 610 and the TCR 620 are equal and the detailed operation control methods are as follows.

|  | Load current | Reactive power | Bus voltage |
| --- | --- | --- | --- |
| TCR | Inductive current | Reactive power is consumed | Bus voltage drops |
| TSC | Capacitive current | Reactive power is generated | Bus voltage rises |

The control apparatus 100 may measure each of the three phases, determine whether unbalance occurs in the three-phase current based on the phase current, and individually control the current of each phase such that unbalance is compensated for according to phase currents when unbalance occurs.

In the present invention, a control method for improving control when unbalance occurs in three-phase current in the SVC system 600 including the TSC 610 or the TCR 620 has been described. However, the present invention is not limited thereto and the control method is applicable to all kinds of power conversion apparatuses including a thyristor.

Although the invention has been described with reference to the exemplary embodiments, the present invention is not limited thereto and those skilled in the art will appreciate that various modifications and variations can be made in the present invention without departing from the spirit or scope of the invention. For example, those skilled in the art may modify the components of the embodiments. Differences related to such modifications and applications are interpreted as being within the scope of the present invention described in the appended claims.

The invention claimed is:

1. A control apparatus in a static VAR compensator (SVC) system, comprising:
   a plurality of current supply units configured to supply phase currents configuring three-phase current of a power system;
   a plurality of current sensors configured to measure the phase currents; and
   a controller configured to determine whether unbalance occurs in the three-phase current based on the phase currents, calculate an error corresponding to the unbalance according to the phase currents if the unbalance occurs, and individually control at least one of the plurality of current supply units so as to compensate for the error,
   wherein the controller includes:
      a plurality of differentiators, wherein the plurality of differentiators differentiate the phase currents,
      a plurality of integrators, wherein the plurality of integrators generate first values by integrating the differentiated phase currents,
      a plurality of constant determination units, wherein the plurality of constant determination units generate second values by applying a constant to the first values, and
      an adder, wherein the adder adds the second values to determine whether the unbalance occurs in the three-phase current.

2. The control apparatus according to claim 1, wherein:
   each of the plurality of current supply units includes a thyristor which is turned on in order to supply the phase currents; and
   the controller individually turns the thyristor on so as to compensate for the unbalance according to the phase currents.

3. The control apparatus according to claim 1, wherein the controller calculates a root mean square (RMS) value of the three-phase current and determines whether the unbalance occurs in the three-phase current based on the RMS value.

4. The control apparatus according to claim 1, wherein the controller measures and applies an internal current of the SVC system and calculates a constant for operation characteristics of the SVC system.

5. A control method of a control apparatus in a static VAR compensator (SVC) system, the control method comprising:
   supplying phase currents configuring three-phase current of a power system;
   measuring the phase currents;
   determining whether unbalance occurs in the three-phase current based on the phase currents;
   calculating an error corresponding to the unbalance according to the phase currents if the unbalance occurs; and
   individually controlling at least one of a plurality of current supply units so as to compensate for the error;
   wherein the determining step includes:
      differentiating the phase currents;
      integrating the differentiated phase currents to generate first values;
      applying a constant to the first values to generate second values; and
      adding the second values to determine whether the unbalance occurs in the three-phase current.

6. The control method according to claim 5, wherein:
   each of the plurality of current supply units includes a thyristor which is turned on in order to supply the phase currents; and
   the control apparatus individually turns the thyristor on so as to compensate for the unbalance according to the phase currents.

7. The control method according to claim 5, further comprising:
   calculating a root mean square (RMS) value of the three-phase current; and
   determining whether the unbalance occurs in the three-phase current based on the RMS value.

8. The control method according to claim 7, further comprising:
   measuring and applying an internal current of the SVC system; and
   calculating a constant for operation characteristics of the SVC system.

9. A static VAR compensator (SVC) system, comprising:
   a device configured to supply phase currents configuring three-phase current of a power system; and
   a control apparatus configured to measure the phase currents, determine whether unbalance occurs in the three-phase current based on the phase currents, and individually control at least one of the phase currents so as to compensate for the unbalance according to the phase currents when the unbalance occurs,
   wherein the control apparatus is further configured to:
   differentiate the phase currents,
   generate first values by integrating the differentiated phase currents,
   generate second values by applying a constant to the first values, and
   add the second values to determine whether the unbalance occurs in the three-phase current.

10. The SVC system according to claim 9, wherein the control apparatus calculates an error corresponding to the unbalance according to the phase currents and individually controls at least one of the phase currents so as to compensate for the error.

\* \* \* \* \*